(12) United States Patent
Buckholdt et al.

(10) Patent No.: US 8,693,126 B2
(45) Date of Patent: Apr. 8, 2014

(54) ULTRA FAST DISK ACCESS USING ARRAYS OF FIXED READ/WRITE TRANSDUCERS

(75) Inventors: Wayne L. Buckholdt, Duluth, GA (US); Robert W. Warren, Loveland, CO (US)

(73) Assignee: LSI Corporation, San Jose, CA (US)

(*) Notice: Subject to any disclaimer, the term of this patent is extended or adjusted under 35 U.S.C. 154(b) by 905 days.

(21) Appl. No.: 12/840,498

(22) Filed: Jul. 21, 2010

(65) Prior Publication Data

US 2011/0228422 A1 Sep. 22, 2011

Related U.S. Application Data

(60) Provisional application No. 61/314,244, filed on Mar. 16, 2010.

(51) Int. Cl.
*G11B 5/29* (2006.01)
*G11B 21/02* (2006.01)

(52) U.S. Cl.
USPC .............. 360/55; 360/63; 360/78.12; 360/75

(58) Field of Classification Search
None
See application file for complete search history.

(56) References Cited

U.S. PATENT DOCUMENTS

| | | | | | |
|---|---|---|---|---|---|
| 3,662,361 | A | * | 5/1972 | Mee | 360/123.01 |
| 3,772,666 | A | * | 11/1973 | Scholz et al. | 360/75 |
| 5,606,474 | A | * | 2/1997 | Ketchersid, III | 360/63 |
| 5,652,685 | A | * | 7/1997 | Ketchersid, III | 360/125.01 |
| 5,729,408 | A | * | 3/1998 | Kikitsu | 360/61 |
| 5,761,166 | A | * | 6/1998 | Sedlmayr et al. | 360/69 |
| 5,995,461 | A | * | 11/1999 | Sedlmayr et al. | 360/75 |
| 6,078,468 | A | * | 6/2000 | Fiske | 360/97.11 |
| 6,078,471 | A | * | 6/2000 | Fiske | 360/254.2 |
| 6,081,402 | A | * | 6/2000 | Cho | 360/75 |
| 6,195,230 | B1 | * | 2/2001 | O'Connor | 360/121 |
| 6,195,231 | B1 | * | 2/2001 | Sedlmayr et al. | 360/123.17 |
| 6,249,824 | B1 | * | 6/2001 | Henrichs | 710/8 |
| 7,289,285 | B2 | * | 10/2007 | Barnes | 360/59 |
| 8,279,545 | B2 | * | 10/2012 | Hillis et al. | 360/61 |
| 2004/0130815 | A1 | | 7/2004 | Barnes | 360/31 |
| 2006/0119973 | A1 | * | 6/2006 | Jamail | 360/63 |
| 2007/0230003 | A1 | * | 10/2007 | Barnes | 360/31 |
| 2007/0253112 | A1 | * | 11/2007 | Hall | 360/244 |
| 2010/0208384 | A1 | * | 8/2010 | Tran | 360/75 |

FOREIGN PATENT DOCUMENTS

GB 2422243 A 7/2006 ............ G11B 21/00
JP 04366474 A * 12/1992

* cited by examiner

*Primary Examiner* — Wayne Young
*Assistant Examiner* — James L Habermehl
(74) *Attorney, Agent, or Firm* — Christopher P. Maiorana, PC (57) ABSTRACT

An apparatus comprising a magnetic media and a read/write unit. The magnetic media may be configured to store data. The magnetic media may also be rotated during access of the magnetic media. The read/write unit may comprise a plurality of transducers arranged in a linear array. Each of the transducers may be fabricated on a semiconductor substrate with fixed head positions with respect to the magnetic media. The read/write unit may also be positioned in close proximity to and across the surface of the magnetic media. Each transducer may be configured to read data from the magnetic media and write data to the magnetic media.

12 Claims, 7 Drawing Sheets

ULTRA FAST DISK ACCESS USING ARRAYS OF FIXED READ/WRITE TRANSDUCERS

This application claims the benefit of U.S. Provisional Application No. 61/314,244, filed Mar. 16, 2010 and is hereby incorporated by reference in its entirety.

FIELD OF THE INVENTION

The present invention relates to data storage generally and, more particularly, to a method and/or apparatus for implementing an ultra fast disk access using arrays of fixed read/write transducers.

BACKGROUND OF THE INVENTION

Conventional approaches have been explored to solve disk head seek time and rotational delay problems. One approach has been to mitigate such problems by using random access memory (RAM) on the disk drive. Using random access memory on the disk drive allows the disk drive to cache the data that is likely to be requested next and to write-back the data in a sorted order to minimize the movement of the disk drive read/write head. Another approach has been to use lighter weight heads that move quicker. Ceramic glass platters that spin faster have also been implemented. While using lighter weight heads and/or spinning the platters faster has been somewhat effective at increasing performance, due to mechanical limitations, disk access performance has dramatically lagged the increase in performance of central processing units. The performance bottleneck in most servers is disk access delays.

It would be desirable to implement a method and/or apparatus implementing an ultra fast disk access using arrays of fixed read/write transducers.

SUMMARY OF THE INVENTION

The present invention concerns an apparatus comprising a magnetic media and a read/write unit. The magnetic media may be configured to store data. The magnetic media may also be rotated during access of the magnetic media. The read/write unit may comprise a plurality of transducers arranged in a linear array. Each of the transducers may be fabricated on a semiconductor substrate with fixed head positions with respect to the magnetic media. The read/write unit may also be positioned in close proximity to and across the surface of the magnetic media. Each transducer may be configured to read data from the magnetic media and write data to the magnetic media.

The objects, features and advantages of the present invention include providing a disk drive that may (i) eliminate delays due to head seek time, (ii) significantly reduce rotational delay, (iii) increase the aggregate media transfer rate, (iv) implement a number of read/write units to allow simultaneous read and write operations to the disk, (v) provide a quiet operation, (vi) provide a longer drive life, (vii) reduce production costs (viii) make use of advances in semiconductor technology and/or (ix) consume less power than conventional disk drives.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may implement an apparatus and/or method for ultra fast disk access using arrays of fixed read/write transducers. Due to head seek time and rotational delays, access times for disk drives are currently two to three orders of magnitude slower than access times for solid state storage devices. By using an array of fixed read/write transducers on a fixed assembly that radially spans the recordable area, head seek time may be essentially eliminated. The rotational delay may also be further reduced by duplicating the arrays of fixed read/write transducers at angular distances around the surface of the disk. Duplicating the arrays of fixed read/write transducers may also increase the number of reads and writes that may occur in parallel. The fixed read/write transducers may be fabricated on a silicon chip. The aggregate media transfer rate may be increased until the disk drive interface bandwidth is saturated. Combined, these factors allow disk performance to improve by more than an order of magnitude.

Figure 1:
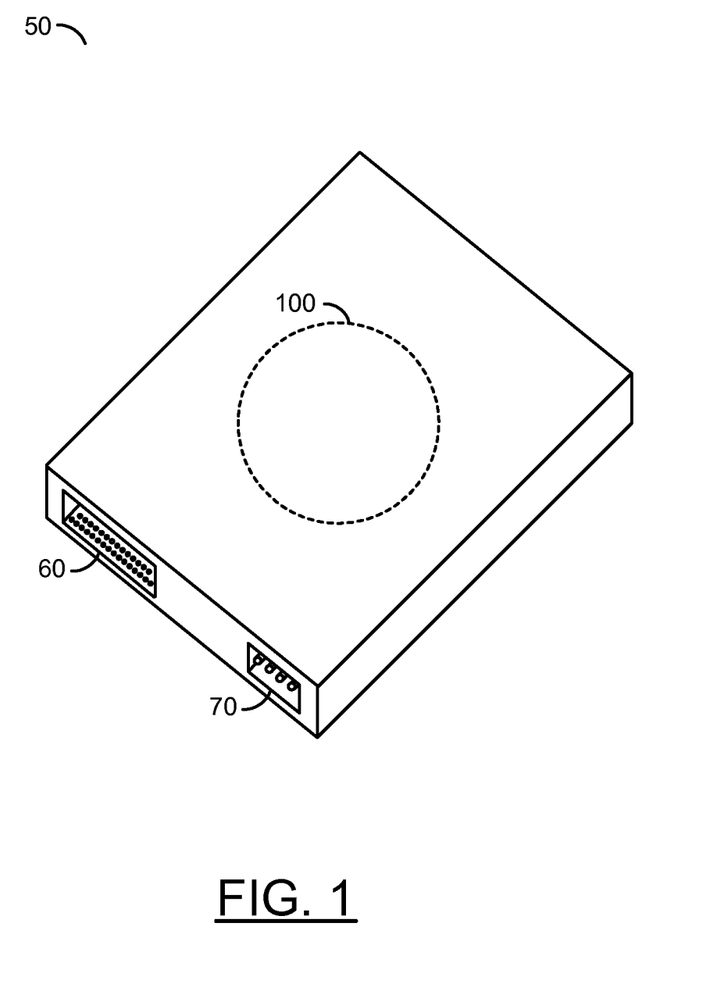
FIG. 1 is a diagram of a disk drive implementing an embodiment of the present invention.

Referring to FIG. 1, a block diagram of a block (or circuit) 50 employing an embodiment of the present invention is shown. The block 50 may generally be implemented as a disk drive. The block 50 generally comprises a block (or circuit) 60, a block (or circuit) 70, and a block (or circuit) 100. The block 60 may be implemented as an interface connector. The block 70 may be implemented as a power supply connector. The block 100 may implement one or more read/write units.

The disk drive 50 may be accessed as a mass storage device through the interface connector 60. The disk drive 50 may be supplied with power through the power supply connector 70. The system 100 is described below in more detail in connection with FIGS. 2-5.

Figure 2:
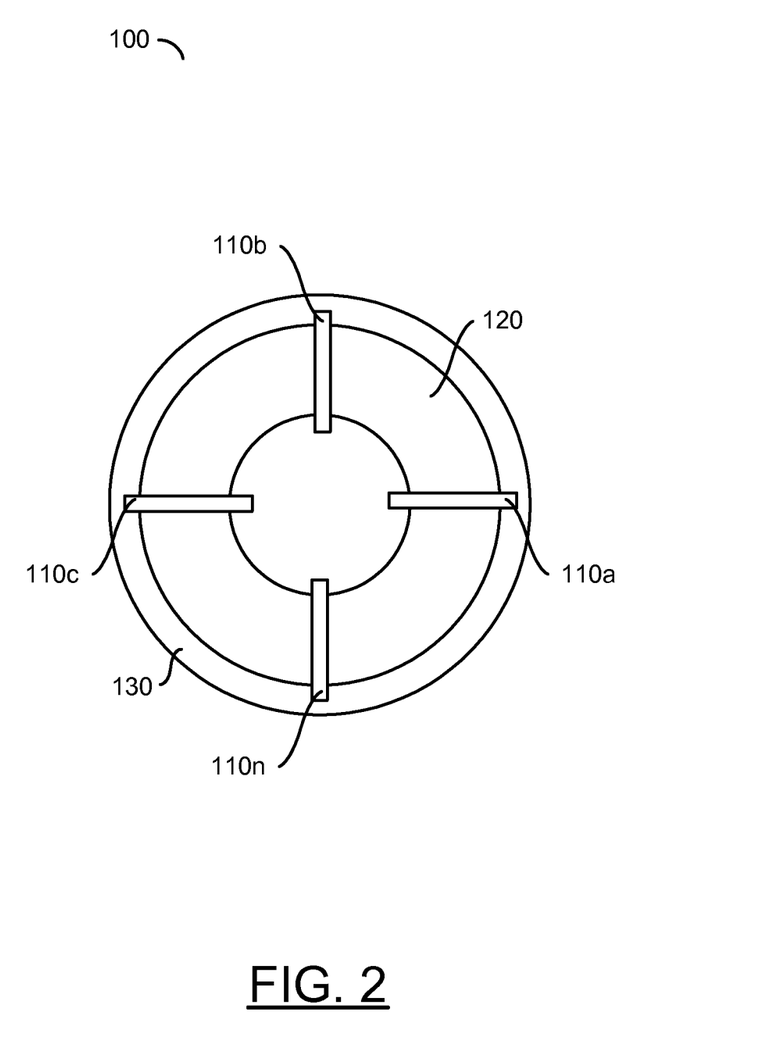
FIG. 2 is a diagram of an embodiment of the present invention showing four head stripe assemblies spaced 90 degrees apart.

Referring to FIG. 2, a block diagram of a system 100 is shown. The system 100 generally comprises an ultra fast disk access system. The system 100 generally comprises a number of blocks (or circuits) 110a-110n, a block (or circuit) 120, and a block (or circuit) 130. The blocks 110a-110n may be implemented as read/write units. In one example, each of the blocks 110a-110n comprise a head stripe assembly. Each of the head stripe assemblies 110a-110n may include a plurality of fixed read/write transducers (to be described in more detail in connection with FIG. 3). The block 120 may be implemented as a recordable area of a magnetic media. The block 130 may be implemented as a housing. The system 100 may use the head stripe assemblies units 110a-110n to read and/or write data to a magnetic media 120.

In general, each of the head stripe assemblies 110a-110n may be mounted in a generally fixed manner. However, the head stripe assemblies 110a-110n may be configured to move a short distance to account for vibrations of the magnetic media 120. While four head stripe assemblies 110a-110n are shown in FIG. 2, the particular number of head stripe assemblies 110a-110n may be varied to meet the design criteria of a particular implementation. For example, a single head stripe assembly (e.g., 110a) may be implemented. In another example, two head stripe assemblies (e.g., 110a and 110b) may be implemented. In another example, more than two head stripe assemblies 110a-110n (e.g., 3-8, or more) may be implemented.

The head stripe assemblies 110a-110n may be positioned radially across and above the surface of the magnetic media 120. The head stripe assemblies 110a-110n may be positioned sufficiently close to the magnetic media 120 to permit each of the head stripe assemblies 110a-110n to read and/or write data to and/or from the magnetic media 120. In one example, at least one end of each of the head stripe assemblies 110a-110n may be connected to the housing 130. By connecting at least one end of each of the head stripe assemblies 110a-110n, the position of the head stripe assemblies 110a-110n is generally maintained radially across and above the magnetic media 120.

Figure 3:
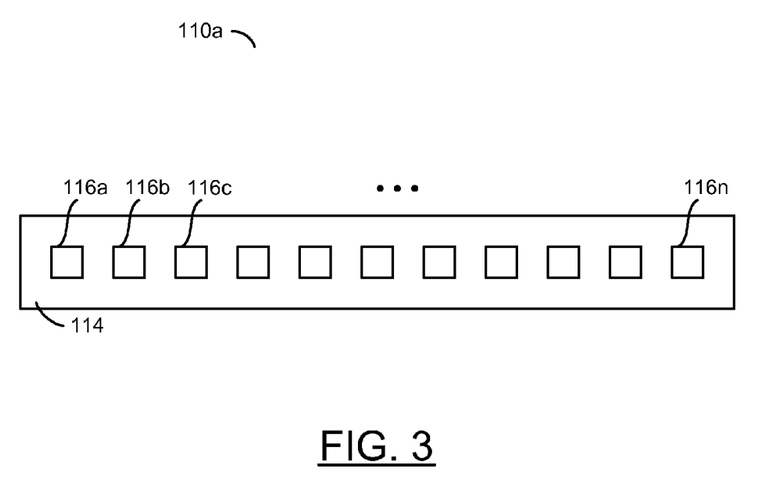
FIG. 3 is a diagram of the read/write transducers implemented on a silicon chip of a head stripe assembly.

Referring to FIG. 3, a more detailed diagram of a portion of one of the head stripe assemblies (e.g., 110a) is shown. Each of the head stripe assemblies 110a-110n generally comprise a block (or circuit) 114 and a number of blocks (or circuits) 116a-116n. The block 114 may be implemented as a substrate. The blocks 116a-116n may be implemented as semiconductor read/write transducers. For example, the substrate 114 may be silicon or some other type of semiconductor substrate. The substrate 114 may allow a number of read/write transducers 116a-116n to be fabricated close together. The substrate 114 may also allow a number of read/write transducers 116a-116n to be fabricated simultaneously. The substrate 114 may reduce the cost of fabrication of the system 100. The substrate 114 may be mounted to the underside of the head stripe assemblies 110a-110n closest to the recordable area of the magnetic media 120.

The read/write transducers 116a-116n may be mounted to the substrate 114. The read/write transducers 116a-116n are shown configured in a generally side by side arrangement in a single row. However, other arrangements of the read/write transducers 116a-116n may be implemented. For example, a staggered arrangement may be implemented (to be described in more detail in connection with FIG. 4). Each of the read/write transducers 116a-116n may be aligned with a track on the recordable area of a magnetic media 120 (to be described in more detail in connection with FIG. 5). Each of the read/write transducers 116a-116n may be configured to read and/or write data to a particular track of the recordable area of a magnetic media 120 to which the read/write transducers 116a-116n are aligned.

Figure 4:
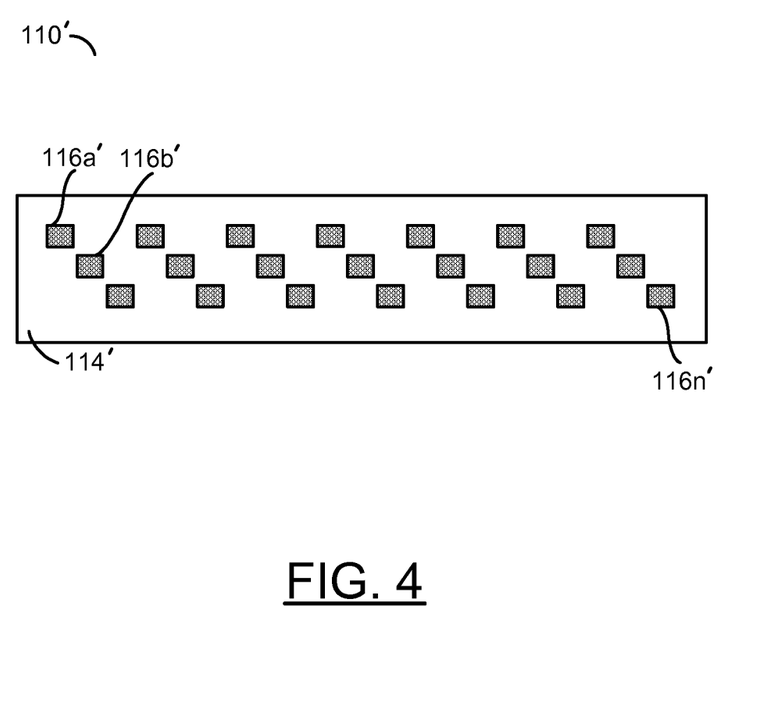
FIG. 4 is a diagram of an embodiment of the present invention where the read/write transducers are staggered in a 2D grid on a silicon chip of the head stripe assembly.

Referring to FIG. 4, a block diagram of a small linear section of a block (or circuit) 110' is shown. The block 110' may be implemented as a read/write unit. More particularly, the block 110' may be implemented as a head stripe assembly comprising a plurality of staggered fixed read/write transducers 116a-116n in accordance with an alternative embodiment of the system 100. The head stripe assembly 110' generally comprises a block (or circuit) 114' and a number of blocks (or circuits) 116a'-116n'. The substrate 114' may be mounted to the underside of the head stripe assembly 110' closest to the recordable area of the magnetic media 120. The read/write transducers 116a'-116n' may be implemented as semiconductor read/write transducers. The read/write transducers 116a'-116n' may be fabricated into the substrate 114'. Each of the read/write transducers 116a'-116n' may be fabricated as a portion of the substrate 114' in order to match the linear track spacing of the magnetic media 120. Each of the read/write transducers 116a'-116n' may be configured to read and/or write data to the track of the magnetic media 120 to which the read/write transducers 116a'-116n' are aligned.

In one example, the read/write transducers 116a'-116n' may be staggered on the silicon chip in a 2D grid, much like the nozzles in an ink-jet printer. Such an arrangement may be useful if the spacing between the tracks on the magnetic media prevents the read/write transducers 116a-116n from easily being implemented in a side by side arrangement. In another example, the read/write transducers 116a'-116n' may be staggered less than a track width apart to improve signal to noise ratio when reading data. Staggering the read/write transducers 116a'-116n' less than a track width apart may also substantially reduce unrecoverable bit error rates and may permit an increase in the track density of the magnetic media 120. Staggering the read/write transducers 116a'-116n' may also allow the heads of the read/write transducers 116a'-116n' to overlap sections of a track of data, allowing an averaging to occur if both close proximity heads are able to read simultaneously. Such an implementation may allow the SNR of the data retrieved to be greater than a read from a single track. In one implementation, enough movement to allow more than two heads to read a track may be implemented.

Logic may be implemented to read and write the magnetic bits from the magnetic media 120. Such logic generally needs to be duplicated for each of the particular read/write transducers 116a-116n configured to read/write to each respective track of the magnetic media 120. To save silicon real estate, logic that filters noise, detects and corrects media errors, and/or serializes the data stream may be shared between the read/write transducers 116a-116n of a given one of the head stripe assemblies 110a-110n. However, such logic may also be duplicated for each of the read/write transducers 116a-116n in certain applications. The substrate may allow additional circuitry to be added to increase SNR. For example, the substrate may be implemented to allow a preamplifier circuit to be implemented on the head. Such an implementation may reduce the distance between the read/write head and the preamplifier.

The system 100 may use the head stripe assemblies 110a-110n and the read/write transducers 116a-116n to match the track spacing of the magnetic media 120. Since the read/write transducers 116a-116n generally do not move, or move very little, head seek time delays associated with a moving read/write head are essentially eliminated. A number of the head stripe assemblies 110a-110n comprising the arrays of read/write transducers 116a-116n may be implemented around the magnetic media 120. In one example, two of the head stripe assemblies 110a-110n may be spaced 180 degrees apart. Such a configuration may reduce the average rotational delay by 50%. In another example, three head stripe assemblies 110a-110n may be spaced 120 degrees apart. Such an implementation may reduce the average rotational delay by approximately 66%. With more than one head stripe assembly 110a-110n, more than one location of the magnetic media 120 may be read from or written to simultaneously. Performing simultaneous read and/or writes from two or more of the head stripe assemblies 110a-110n may yield another performance boost of 100% or more. While spacing the head stripe assemblies 110a-110n may be useful in certain applications, the head stripe assemblies 110a-110n may be positioned close to each other. Positioning the head stripe assemblies 110a-110n close to each other may reduce assembly costs.

In another example, four of the head stripe assemblies 110a-110n may be radially positioned generally 90 degrees apart for a four head stripe assembly configuration. In another example, a low-end consumer drive might use a single head stripe assembly 110. A high-end enterprise drive might use six head stripe assemblies 110a-110n spaced 60 degrees apart. Using six head stripe assemblies 110a-110n would generally both reduce the rotational delay by a factor of six times and increase the number of simultaneous reads or writes by six times. The upper bound to the maximum media transfer would then generally be the disk drive interface transfer rate, which for current state of the art Serial Attached SCSI (SAS) drives is around 6 Gbits per second. In general, the number of head stripe assemblies 110a-110n may generally be limited by the available space within the disk drive and the manufacturing price point of a particular implementation.

Given the advances in semiconductor technology and the decreasing size of disk drives over the years (e.g., from 14 inch platters to the now common 3.5 inch and 2.5 inch platters), manufacturing an array of read/write transducers 116a-116n that radially span across the entire recordable area is feasible. In the case of a 3.5 inch disk drive, the recordable area spans approximately one inch. In the case of a 2.5 inch disk drive, the recordable area spans approximately three quarters of an inch. At a current track density of around 150,000 to 180,000 tracks per inch, the number of read/write transducers 116a-116n generally needed for a single silicon chip ranges between 150,000 to 180,000 for a 3.5 inch drive and from 110,000 to 135,000 for a 2.5 inch drive.

Figure 5:
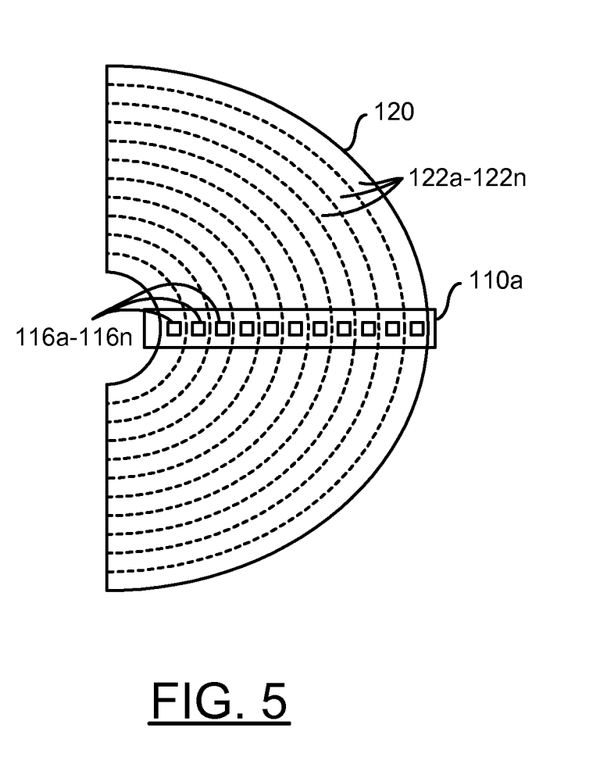
FIG. 5 is a more detailed diagram of a portion of the recordable area of a magnetic media illustrating the tracks of the magnetic media and a read/write transducer aligned to each track.

Referring to FIG. 5, a more detailed diagram of a portion of the recordable area of magnetic media 120 is shown. The magnetic media 120 generally comprises a number of tracks 122a-122n. The tracks 122a-122n may be implemented as a plurality of tracks on the recordable area of magnetic media 120. The number of tracks 122a-122n may vary depending on the surface area and/or storage density of the magnetic media 120. One of the head stripe assemblies (e.g., 110a) is shown positioned above and across a portion of the magnetic media 120. A number of the read/write transducers 116a-116n associated with the head stripe assembly 110a are shown with a particular read/write transducer (e.g., 116a) aligned with a particular track (e.g., 122a). In a similar configuration, the fixed read/write transducer 116b may be aligned with track 122b. The other fixed read/write transducers 116c-116n and the tracks 122c-122n may be similarly aligned. Data written to or read from each of the tracks 122a-122n is generally performed by the respective read/write transducers 116a-116n aligned to that particular track 122a-122n. When combined with a number of the head stripe assemblies 110a-110n each of the tracks 122a-122n may be written to or read from simultaneously by each of the read/write transducers 116a-116n associated with the tracks 122a-122n.

In general, the head stripe assemblies 110a-110n may generally move a short distance (e.g., at least one track width). Allowing the head stripe assemblies 110a-110n to move at least one track width may allow the system 100 to recover from unexpected vibration. In some cases, movement of the head stripe assemblies 110a-110n of up to a millimeter may be desirable in order to compensate for a vibration.

Figure 6:
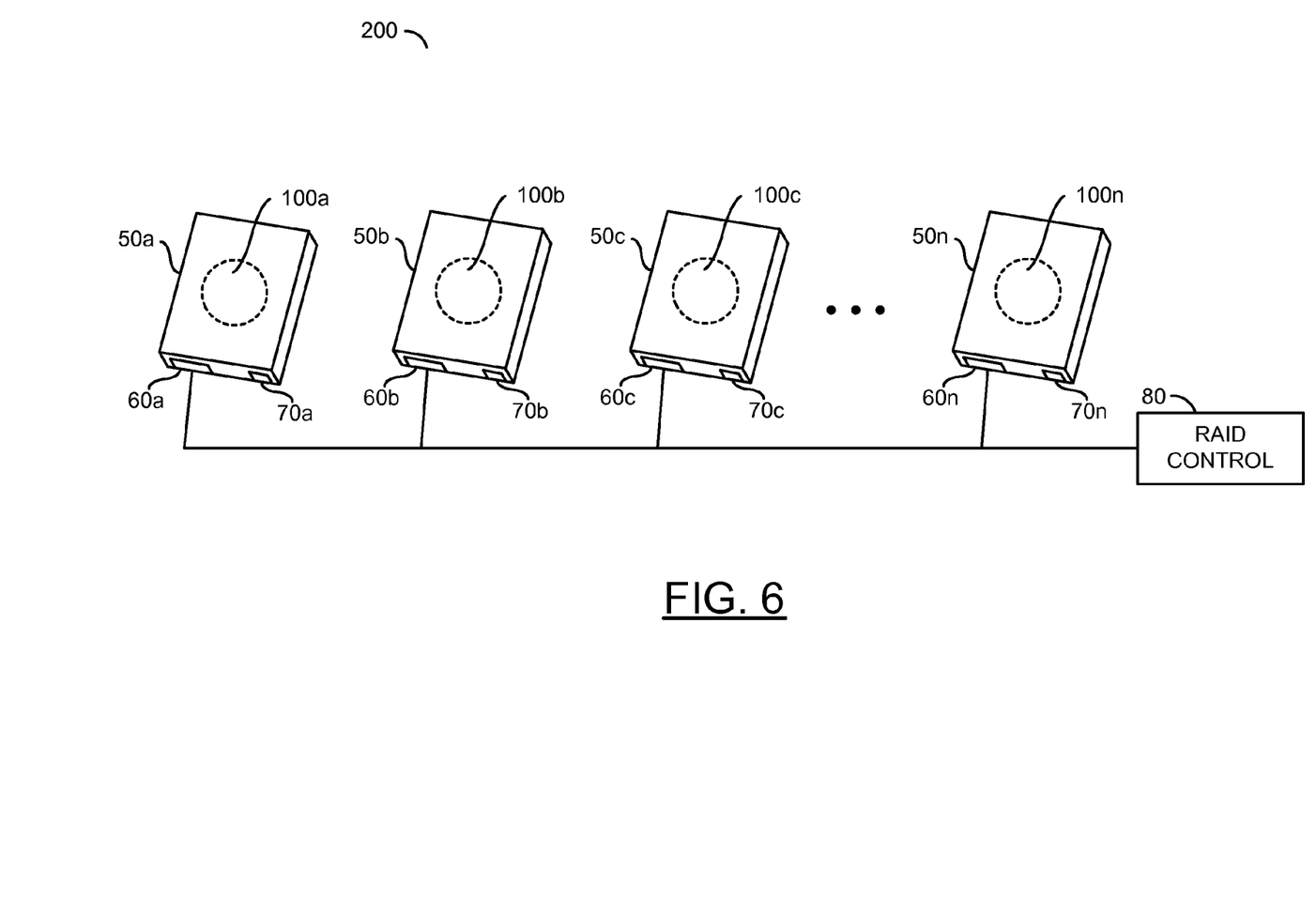
FIG. 6 is a diagram of an embodiment of the present invention implementing a plurality of disk drives each employing an embodiment of the present invention.

Referring to FIG. 6, a block diagram of a system 200 is shown implementing an application of the present invention. The system 200 generally comprises a plurality of blocks (or circuits) 50a-50n, a plurality of blocks (or circuits) 60a-60n, a plurality of blocks (or circuits) 70-70n, a block (or circuit) 80, and a plurality of blocks (or circuits) 100a-100n. Each of the blocks 50a-50n may be implemented as a disk drive employing the system 100. Each of the blocks 60a-60n may be implemented as an interface connector for connecting each of the disk drives 50a-50n with block 80. Each of the blocks 70a-70n may be implemented as a power supply connector to supply operating power to each of the blocks 50a-50n. The block 80 may be implemented as a RAID controller device. Each of the blocks 100a-100n may implement the system 100.

Figure 7:
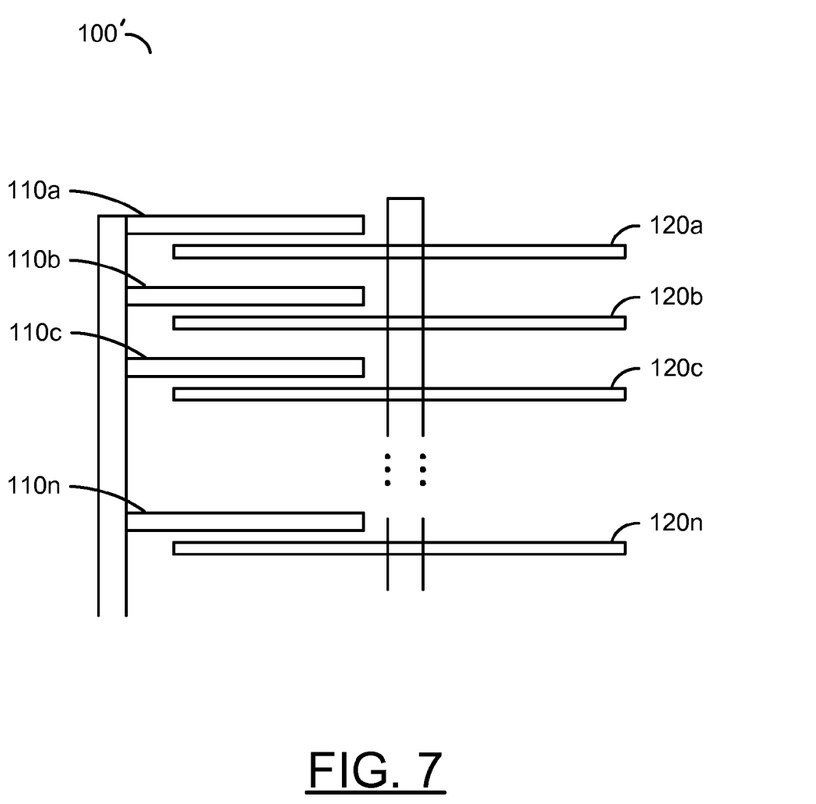
FIG. 7 is a diagram of an embodiment of the present invention implementing a plurality of magnetic media with one or more head stripe assemblies employed on each magnetic media.

Referring to FIG. 7, a block diagram of a system 100' implementing an alternate embodiment is shown. The system 100' generally comprises a number of blocks (or circuits) 120a-120n and a number of head stripe assemblies 110a-110n (or 110'a-110'n). The blocks 120a-120n may be implemented as a plurality of recordable magnetic media. Each of the magnetic media 120a-120n may have one or more of head stripe assemblies 110a-110n configured to read and/or write data to a recordable area of the magnetic media 120a-120n. The magnetic media 120a-120n may be configured to have recordable areas on one side or both sides. Implementing multiple magnetic media 120a-120n increases the data that may be stored in a disk drive employing an embodiment of the present invention.

In addition to performance enhancements, the head stripe assemblies 110a-110n may provide other benefits. The system 100 may run quieter during operation than conventional disk drives, since no head movement occurs during seeks or when the data transitions across tracks 122a-122n. When mass produced, the head stripe assemblies 110a-110n are likely to be less expensive than the moving head actuators, resulting in a net cost savings. Drive life will likely be extended since a solid state array of the read/write transducers 116a-116n should be more reliable than mechanical head actuators. Since no head actuator (e.g., a stepper motor, a server motor, or a voice coil) is generally needed by the system 100, a net power savings may result. The system 100 may implement very small movements of the heads (e.g., sub 1 track pitch). The system 100 may be much easier to implement. While moving mass may increase, the amount of overall movement is generally reduced. Less environmental movement may be received, since such movement may be dampened.

The head stripe assemblies 110a-110n may consume less power than the mechanical energy generally needed to spin the magnetic media 120 of the system 100. The magnetic media 120 may also spin at a slower rate for power sensitive applications while still maintaining the same performance. For example, with two head stripe assemblies 110a-110n, a drive that normally spins at 7200 rpm may spin at half the rotational rate of 3600 rpm, while still sustaining the same level of performance. A performance boost and a power savings may be possible using certain arrangements (e.g., a four head stripe assembly arrangement). As a side benefit, by spinning the platters at a lower speed, the drive will generally run quieter and cooler, which may be especially important for media center personal computers and laptop computers.

The power generally needed for the head stripe assemblies 110a-110n may be minimized by selecting and powering the read/write transducers 116a-116n that are actively involved in a given data transfer. All of the other read/write transducers 116a-116n in the head stripe assemblies 110a-110n may be left idle. Alternatively, when performance is the main goal, reading and writing from more than one of the read/write transducers 116a-116n in parallel may be possible, provided the logic to filter noise, detect and correct bit errors, and serialize the data is duplicated.

In certain implementations, the head stripe assemblies 110a-110n may be too large and/or too heavy to be suspended above the disk using an air cushion and one point of attachment. The head stripe assemblies 110a-110n may be attached to the housing 130 at both ends in such case. The embodiments where the head stripe assemblies 110a-110n are attached to the housing 130 at both ends normally implement one magnetic media 120, thus allowing two recording surfaces per disk drive. The read/write transducers 116a-116n generally retain a relative position above the tracks 122a-122n of the magnetic media 120. The thermal expansion of the magnetic media 120 may alter the position of the read/write transducers 116a-116n. A semiconductor material and/or magnetic media 120 may be chosen that have closely matched coefficients of thermal expansion to reduce the effect of thermal expansion.

The system 100 generally provides a random disk access time that is less than the average head seek time plus the average rotational delay (one half of a disk revolution). Conventional approaches will not generally meet such improved disk access times.

As used herein, the term "simultaneously" is meant to describe events that share some common time period but the term is not meant to be limited to events that begin at the same point in time, end at the same point in time, or have the same duration.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a magnetic media configured to store data, wherein said magnetic media is rotated during access of said magnetic media comprising a plurality of tracks; and
   a read/write unit comprising a plurality of transducers arranged in a linear array, wherein (i) each of said transducers is fabricated on a semiconductor substrate with fixed head positions with respect to said magnetic media, (ii) said read/write unit is positioned in close proximity to and across a surface of said magnetic media, and (iii) each of said transducers of said read/write unit is configured to read said data from said magnetic media and write said data to said magnetic media, (iv) said plurality of transducers are staggered on said read/write unit to accommodate said plurality of tracks and (v) two of said transducers are positioned to read and write for each track of said magnetic media.

2. The apparatus of claim 1, wherein said read/write transducers are configured to be moveable to allow each of said transducers to read said respective one of said tracks and an adjacent one of said tracks.

3. The apparatus of claim 1, wherein said apparatus comprises a plurality of said read/write units positioned around said magnetic media in a radial configuration.

4. The apparatus of claim 3, wherein each read/write unit actively involved in a read/write operation is provided power and all other read/write units of said plurality of read/write units are not provided with power.

5. The apparatus of claim 1, wherein a coefficient of thermal expansion for said magnetic media is matched to a coefficient of thermal expansion for said read/write unit.

6. The apparatus of claim 1, wherein said read/write unit is radially positioned around the surface of said magnetic media.

7. The apparatus of claim 1, wherein said apparatus further comprises a housing and said read/write units are connected to said housing on at least one end of said read/write unit.

8. The apparatus of claim 1, wherein said read/write unit is configured to read from a first track of said magnetic media and write to a second track of said magnetic media.

9. The apparatus of claim 8, wherein said read/write unit is configured to read from said first track of said magnetic media and said second track of said magnetic media at the same time.

10. The apparatus of claim 8, wherein said read/write unit is configured to write to said first track of said magnetic media and write to said second track of said magnetic media at the same time.

11. The apparatus of claim 1, wherein said magnetic media comprises a disk in a disk drive.

12. The apparatus of claim 11, wherein said apparatus comprises a plurality of said disks and one or more read/write units for each of said disks.

* * * * *